UNITED STATES PATENT OFFICE.

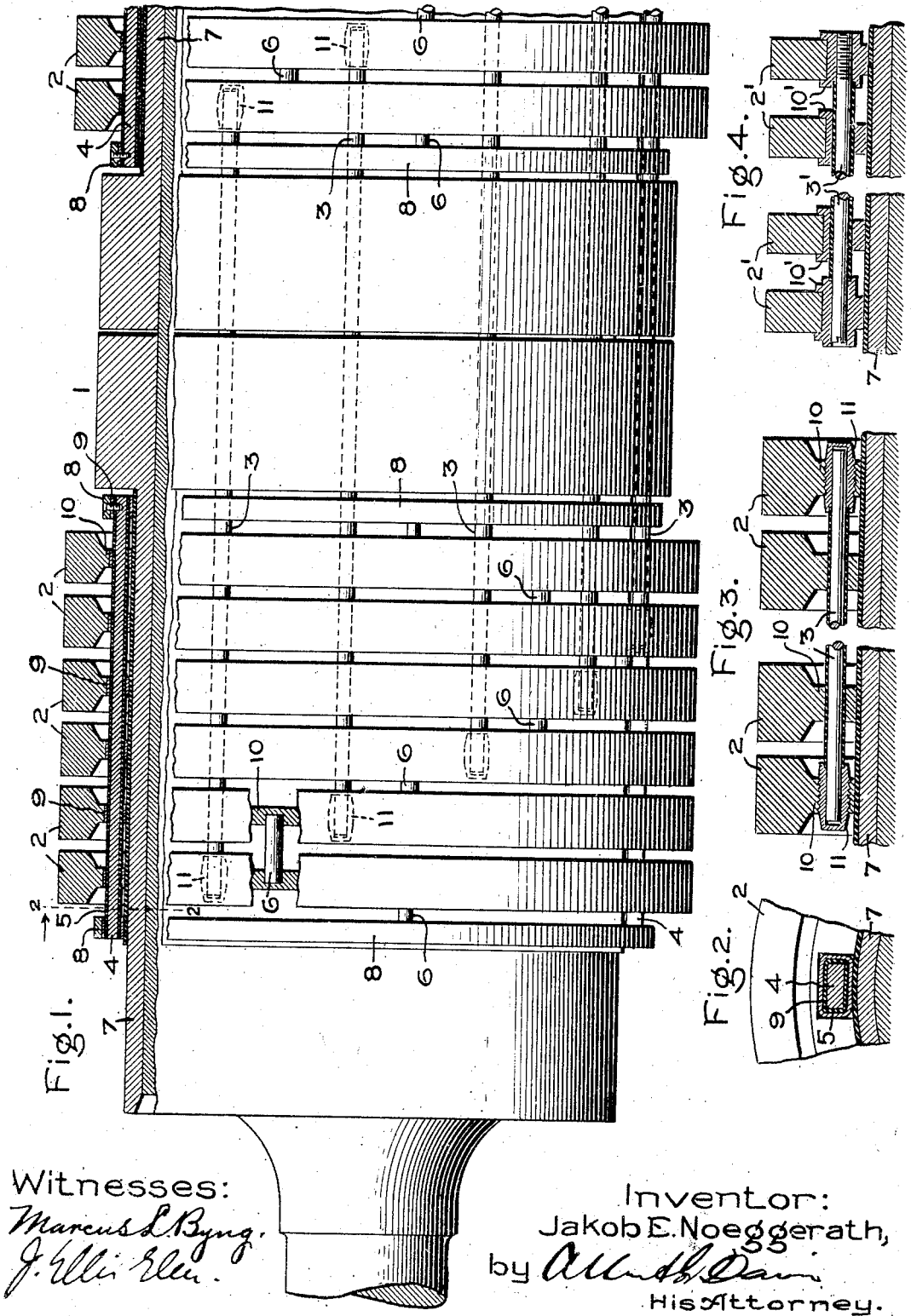

JAKOB E. NOEGGERATH, OF SCHENECTADY, NEW YORK, ASSIGNOR TO GENERAL ELECTRIC COMPANY, A CORPORATION OF NEW YORK.

DYNAMO-ELECTRIC MACHINE.

1,027,145.  Specification of Letters Patent.  Patented May 21, 1912.

Application filed April 21, 1910. Serial No. 556,657.

*To all whom it may concern:*

Be it known that I, JAKOB E. NOEGGERATH, a citizen of the United States, residing at Schenectady, in the county of Schenectady, State of New York, have invented certain new and useful Improvements in Dynamo-Electric Machines, of which the following is a specification.

My invention relates to dynamo-electric machines, and is particularly applicable to such machines of the "unipolar" type.

The object of my invention is a novel arrangement and construction of parts.

Heretofore in fastening collector rings on such machines, they have been shrunk in place on the shell with such a difference between their inside diameter and the outside diameter of the shell that they will stay tightly in place when the machine is running at high speed and the rings are hot. I propose to use collector rings made of bronze, or some such material which will not permit of their being shrunk in place in this way, and my invention consists in preventing relative rotation between the collector shell and these rings by means of an insulated rod or key fitting into each of the rings, the rod being suitably fastened, and the rings being suitably spaced apart in an axial direction by means of insulating members.

My invention also consists in an armature for a unipolar machine having two sets of collector rings and armature conductors between said sets of collector rings, each of said armature conductors being connected to a collector ring of each set, one of said connections being a sliding one, so as to allow for expansion. By constructing the connection between the collector rings and the armature conductors in this way, the minimum size of conductors may be used, which means a saving in copper and also a reduction in the size of the center pole of the armature. With this arrangement, the conductors may be turned down where they pass through the armature core, so that the magnetic material of the armature may have the greatest possible section.

My invention will best be understood by reference to the following description taken in connection with the accompanying drawing, in which—

Figure 1 shows a side elevation, partly in section, of an armature of a unipolar machine, arranged in accordance with my invention; Fig. 2 is a section on the line 2—2 of Fig. 1; Fig. 3 is a sectional view of collector rings and an armature conductor connecting them in accordance with my invention, and Fig. 4 is a view, similar to Fig. 3, of a modification.

In the drawing, 1 is the armature core of a unipolar machine, which is divided at its center into separable parts, which may be moved away from each other along the shaft. A set of collector rings 2 is carried at each end of the armature. Armature conductors 3 are placed in the armature core and are suitably insulated along their length, except where they are electrically connected to the collector rings. Each set of collector rings is prevented from rotating relative to the shell 7 by a rod or key 4, which is surrounded by insulation 5, and which fits in holes in the collector rings. The rings are suitably spaced apart by insulating members 6. I preferably use three of these spacing members between each two rings. The rods or keys 4 are fastened to each of the shells 7, which form part of the armature. The rods are surrounded by insulation for part of their length, and are fastened in the members 8, which are shrunk on, or otherwise suitably fastened to the shells 7. Spacing members 6 are also provided between the end collector rings and the members 8. I preferably use two rods 4 placed diametrically opposite on the shell for each set of collector rings. The rods 4, which may be rectangular in shape with the corners slightly rounded, as seen in Fig. 2, are surrounded by bands 9, which may be made of binding wire, directly beneath the collector rings which protect the insulation from abrasion when the collector rings are placed in position.

Each of the armature conductors 3 is electrically connected to a collector ring of each set, one or both of the connections being sliding ones. In Figs. 1 and 3, both connections are sliding ones and are made in the feet 10 of the collector rings. In this construction, the conductor 3 has sliding fits in long axially extending holes in the member 11 which are fastened in the feet of the collector rings.

The feet of the collector rings may be made integral therewith, as shown in Fig. 3, or separable from the main portion of the collector rings, as shown in Fig. 4. In Fig.

4 the feet 10' of the collector rings 2' are enlarged in an axial direction at the points where the conductors are connected to them, so as to give a large sliding contact surface. I have also illustrated in Fig. 4 the construction in which one end of the conductor 3' is securely fastened to the foot of the collector ring instead of having sliding connections at both ends.

I desire it to be understood that my invention is not limited to the particular construction shown and described, and I aim in the appended claims to cover all modifications which do not depart from the spirit and scope of my invention.

What I claim as new and desire to secure by Letters Patent of the United States, is—

1. In a dynamo-electric machine, a shell, a set of collector rings, conductors connected to said collector rings, means for preventing relative rotation between said shell and said collector rings comprising an insulated rod fitting in said collector rings, and means for suitably spacing said rings apart comprising insulating members.

2. In a dynamo-electric machine, a shell, a set of collector rings mounted on said shell, conductors connected to said collector rings, means for preventing relative rotation between said shell and said collector rings comprising a rod surrounded by insulation, bands fitting over said insulation, said collector rings fitting over said bands, means for fastening said rod to said shell, and means for suitably spacing said rings apart comprising insulating members.

3. In a dynamo-electric machine, a shell, a set of collector rings mounted on said shell, conductors connected to said collector rings, means for preventing relative rotation between said shell and said collector rings comprising an insulated rod fitting in said collector rings, and members fastened to said shell, said rods being fastened in said members, and means for suitably spacing said rings apart comprising insulating members.

4. An armature for unipolar machines having two sets of collector rings, and armature conductors between said sets of collector rings, each of said armature conductors being connected to a collector ring of each set, one of said connections being a sliding one so as to allow for expansion.

5. An armature for unipolar machines having two sets of collector rings, said rings having feet, armature conductors between said sets of collector rings, each of said armature conductors being connected to the foot of a collector ring of each set, one of said connections being a sliding one so as to allow for expansion.

6. In an armature for unipolar machines, a collector ring having a long axially extending hole therein, and an armature conductor having a sliding fit in said hole.

7. In an armature for unipolar machines, a collector ring, a member having a long axially extending hole therein and fastened in one of said collector rings, and an armature conductor having a sliding fit in said hole.

In witness whereof, I have hereunto set my hand this 18th day of April, 1910.

JAKOB E. NOEGGERATH.

Witnesses:
BENJAMIN B. HULL,
HELEN ORFORD.

---

Copies of this patent may be obtained for five cents each, by addressing the "Commissioner of Patents, Washington, D. C."